(12) United States Patent (10) Patent No.: US 12,571,437 B2

Schmidt-Winkel et al. (45) Date of Patent: Mar. 10, 2026

(54) METHOD FOR CONTROLLING AN OPERATION OF A MOTOR VEHICLE

(71) Applicant: ZF FRIEDRICHSHAFEN AG, Friedrichshafen (DE)

(72) Inventors: Norman Schmidt-Winkel, Kürnach (DE); Fabian Hartmann, Hettstadt (DE); Martin Ruider, Schwarzhofen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/837,402

(22) PCT Filed: Feb. 15, 2023

(86) PCT No.: PCT/EP2023/053704
§ 371 (c)(1),
(2) Date: Aug. 9, 2024

(87) PCT Pub. No.: WO2023/156425
PCT Pub. Date: Aug. 24, 2023

(65) Prior Publication Data
US 2025/0137502 A1 May 1, 2025

(30) Foreign Application Priority Data
Feb. 18, 2022 (DE) ..................... 10 2022 201 711.0

(51) Int. Cl.
F16D 48/06 (2006.01)
(52) U.S. Cl.
CPC .................................... F16D 48/06 (2013.01)

(58) Field of Classification Search
CPC ...................................................... F16D 48/06
See application file for complete search history.

(56) References Cited

U.S. PATENT DOCUMENTS

| | | | |
|---|---|---|---|
| 8,777,807 B2 * | 7/2014 | Schneider | F16H 61/0403 477/174 |
| 2005/0092115 A1 | 5/2005 | Walker et al. | |
| 2008/0262685 A1 | 10/2008 | Asplund et al. | |
| 2010/0042299 A1 * | 2/2010 | Doebele | B60W 10/11 701/51 |

FOREIGN PATENT DOCUMENTS

| | | |
|---|---|---|
| DE | 102005011273 | 9/2006 |
| DE | 102019210134 | 1/2021 |
| EP | 3938674 | 1/2022 |

OTHER PUBLICATIONS

Office Action of corresponding German Patent Application No. DE 10 2022 201 711.0 dated Aug. 2, 2022.

* cited by examiner

*Primary Examiner* — Edwin A Young
(74) *Attorney, Agent, or Firm* — COZEN O'CONNOR

(57) ABSTRACT

A method for controlling an operation of a motor vehicle, in particular controlling a coupling process. The motor vehicle has a coupling mechanism with an actuation device, which actuation device is configured to move a gear unit element, particularly a coupling element, of the coupling mechanism between a coupling position and an uncoupling position. The speed at which the gear unit element is moved into the coupling position is set and/or changed depending on a state parameter of the coupling mechanism.

10 Claims, 2 Drawing Sheets

METHOD FOR CONTROLLING AN OPERATION OF A MOTOR VEHICLE

CROSS REFERENCE TO RELATED APPLICATIONS

This is a U.S. national stage of Application No. PCT/EP2023/053704 filed Feb. 15, 2023. Priority is claimed on German Application No. DE 10 2022 201 711.0 filed Feb. 18, 2022 the content of which is incorporated herein by reference.

BACKGROUND OF THE INVENTION

1. Field of the Invention

The disclosure is directed to a method for the control of an operation of a motor vehicle, in particular control of a coupling process, which motor vehicle has a coupling mechanism with an actuation device, which actuation device is configured to move a gear unit element of the coupling mechanism between a coupling position and an uncoupling position.

2. Description of the Related Art

Methods for controlling the operation of motor vehicles, particularly in relation to the operation of coupling mechanisms, in order to execute coupling processes in the gear unit mechanisms of motor vehicles are known in principle from the prior art. In this respect, an actuation device having an actuator which generates a movement is used to move a gear unit element of the coupling mechanism, for example, a sliding sleeve, a dog or another gear unit element, between a coupling position and an uncoupling position. Typically, a toothing is brought into engagement to produce the coupling, i.e., to bring into the coupling position. When producing the engagement, a tooth butting situation, as it is called, may occur which at least temporarily prevents the teeth from meshing in the corresponding spaces.

Also, it is known that the tooth butting situation can be resolved depending on the rotational movement of the coupling partners. Depending on the driving state or operating situation, it is known that such tooth butting situations prolong the time which must elapse before the coupling position is attained or until the coupling of the gear unit elements is produced. Therefore, on the one hand, it is desirable in some driving states to carry out the coupling as quickly as possible. On the other hand, it is required for the sake of comfort to set an upper limit on the actuation speed in order to lessen negative effects on the operator's perception of the coupling process. For this purpose, a fixed actuation speed is usually set in order to balance the two requirements or adapt to the respective driving state.

A further factor in the control of coupling processes consists in suitably controlling the movement generated by the actuator. As has been described, the actuator produces a movement extending between a start position in which the coupling element is in the uncoupling position and an end position in which the coupling element is in the coupling position. Typically, at least when a tooth butting situation occurs, the actuator cannot carry out the actuation movement continuously because otherwise the gear unit element or coupling element which is blocked against tooth engagement would be moved further by the actuator, which could lead to stressing of the actuation device and possibly result in damage.

One possibility consists in stopping the actuator when a tooth butting situation occurs and restarting the actuator after the tooth butting situation has been resolved so as to reach the end position. Since a tooth butting situation occurs very often during the operation of coupling mechanisms, such an operating strategy results in a large number of starting processes which have a negative impact on the life, particularly the cycles over the lifetime, of the actuator. Further, a comparatively exact monitoring of the actuation path or actuator movement is necessary in order to determine whether or not, or when, the actuator must be stopped and when the actuator can be started again.

SUMMARY OF THE INVENTION

An object of one aspect of the invention is to provide an improved method.

As has been described, one aspect of the invention is directed to a method for controlling an operation of a motor vehicle having a coupling mechanism with an actuation device. By the actuation device, a gear unit element, for example, a coupling element, of the coupling mechanism is moved between a coupling position and an uncoupling position or is brought into the coupling position from the uncoupling position to produce the coupling. One aspect of the invention is based on the insight that the speed at which the gear unit element or coupling element is moved into the coupling position is set and/or changed depending on a state parameter of the coupling mechanism.

Accordingly, one aspect of the invention suggests that the speed at which the gear unit element is moved, which may also be referred to as actuation speed, can be selected depending on the state parameter of the coupling mechanism. Instead of setting a highest possible speed, as a result of which the gear unit element enters a tooth butting situation which requires waiting until it has been resolved, the state parameter of the coupling mechanism can be included so that the speed can be selected accurately such that the gear unit element can be conveyed into the coupling position in a movement that is as continuous as possible.

In other words, the state parameter of the coupling mechanism can be taken into account in such a way that the movement generated by the actuator can be carried out as continuously as possible. In this way, the actuator need not be stopped and started again, but rather its movement can run between the start position and end position. In this regard, the speed is selected in particular in such a way that the actuator can execute a continuous actuation movement without stopping between the start position and the end position. Accordingly, it is advantageously possible that, in spite of a comparatively slower speed, the coupling can ultimately be produced equally fast because the state parameter of the coupling mechanism is taken into account in such a way that the gear unit element is moved at a speed slower than the maximum, compared, for example, with sport shifting, but without having to wait for an anticipated tooth butting situation; rather, the time required for resolving the tooth butting situation is included in the determination of the speed.

Accordingly, the gear unit element is moved at such a speed that the tooth butting situation is resolved and stopping in the tooth butting situation is accordingly unnecessary. Therefore, unnecessarily high actuation speeds or speeds of the gear unit element which, in any event, would not contribute to faster shifting can be avoided. Therefore, there is no longer a need for a large number of blocking positions or stopping processes on the part of the actuator so that the cycles can be appreciably reduced over the lifetime of the actuator. Since the quantity of the starting processes has a decisive influence on the lifetime of the actuator, the life of the actuator can be significantly increased in this way.

Ordinarily, the actuation movement generated by the actuator can also be utilized for detecting the position of the gear unit element because, particularly in case of a continuous actuation movement, the current position of the actuator between the start position and end position is also an indicator for the current position of the gear unit element between the uncoupling position and the coupling position.

When uncoupling spring elements are used between the actuator and the gear unit element or at any optional location, the unambiguous determination of the position of the gear unit element with respect to the actuation path is lost because the spring element can deflect when a tooth butting situation occurs and, therefore, the relationship between the position of the actuator between the start position and end position and the position of the gear unit element between uncoupling position and coupling position is no longer unambiguously defined. In this context, the present arrangement has a further advantage because the detection of the actuation movement produced by the actuator can also be used to detect the position of the gear unit element, since the current position of the actuator between the start position and end position is also an indicator of the current position of the gear unit element between the uncoupling position and the coupling position, particularly during a continuous actuation movement. This is achieved through a predefined limit of the uncoupling travel.

According to a further configuration of the method, it can be provided that the speed is set depending on a resolution duration, particularly an anticipated resolution duration, which defines a time span until a tooth butting situation is resolved. According to this configuration, the previously described state parameter of the coupling mechanism can relate to a resolution duration. The resolution duration indicates how much time is required until an anticipated tooth butting situation is resolved. In this respect, the state parameter can also particularly take into account the manner in which the toothings which are to be brought into engagement with one another need to be rotated relative to one another in order to safely resolve a tooth butting situation. By determining or adjusting or changing the speed at which the actuator produces the movement of the gear unit element, the gear unit element can be moved exactly fast enough that the tooth butting situation is safely resolved until the gear unit element has been moved with its toothing onto the toothing of the corresponding gear unit element. In this respect, slight overlaps of the toothings which do not require stopping the actuator can also be tolerated.

According to a further configuration, the above-described resolution duration can be determined as a maximum time, after the expiration of which a tooth butting situation is resolved regardless of the current position of the gear unit element. In this way, it is possible to determine a maximum time which is the maximum required for resolving the tooth butting situation. The maximum time represents the worst case, for example, in which the toothings can clash against one another during the coupling. In this worst-case scenario, for example, the teeth of the toothings can contact exactly in the area of their tooth flanks opposite the rotational direction requiring that the entire face width be completely swept over in circumferential direction in order to resolve the tooth butting situation. Therefore, the speed can be changed to the extent that no blocking state of the actuator occurs even in the event of the maximum resolution duration or maximum time, but rather the actuation movement can run in a continuous manner. In other words, the tooth butting situation is then resolved even before the stresses in the actuation device would make it necessary to stop the actuator.

As has been described, the speed can be adjusted and/or changed depending on the state of the coupling mechanism or on a state parameter of the coupling mechanism. In so doing, the speed can be set below a maximum possible speed, or a maximum possible speed can be reduced. By maximum possible speed is meant in particular a maximum speed at which the actuator, for example, with maximum actuation, particularly maximum energization, moves the gear unit element as quickly as possible between the uncoupling position and the coupling position.

As was described in the introductory part, such an actuation movement at maximum speed often has the result that the toothing of the gear unit element abuts against the toothing of the gear unit element to be coupled and, as the actuation continues, it is necessary to wait until the tooth butting situation has been resolved. Accordingly, as opposed to this maximum speed, it is possible to reduce the speed so that the total time until the coupling is produced is not increased, or not significantly increased, but the actuation movement can run continuously without needing to interrupt and then restart the movement generated by the actuator.

The resolution duration described above can be determined based on at least one rotational speed of a gear unit element and/or a quantity of teeth of a toothing of a gear unit element and/or on a maximum twist angle between two teeth and/or a maximum tooth overlap. As has already been described, the gear unit elements are those elements of the coupling mechanism or of the gear unit mechanism which must be coupled with one another to produce the coupling state. The gear unit elements can be, for example, dog elements or clutch bodies and sliding sleeve and the like. The resolution duration can accordingly be based on a time determination which takes into account the rotational speed of the gear unit elements relative to one another. The number of teeth of the toothings of the gear unit elements and the twist angles that are necessary in order to resolve emerging tooth butting situations can also be taken into account. To this end, a maximum twist angle between two teeth or a maximum tooth overlap can also be determined, respectively. Ultimately, the twist angle and the tooth overlap also follow from the quantity of teeth. In this regard, the quantity of teeth, the maximum twist angle or maximum tooth overlaps, respectively, can also be utilized as constants when determining the resolution duration because they do not change over the course of operation.

It can further be taken into account that a lower twist angle and, consequently, a shorter resolution duration is necessary with a higher number of teeth. The relative rotational speeds of the gear unit elements also impact the maximum resolution duration. If the relative rotational speeds are comparatively low, the resolution duration can be higher than it would be at comparatively higher rotational speeds of the gear unit elements. In this regard, it must be taken into consideration that rotational speeds or relative rotational speeds that are too high may cause the gear unit elements to be thrown out, thereby increasing the resolution duration.

Further parameters can be taken into consideration aside from the state parameters of the coupling mechanism. The speed can be determined additionally depending on at least one further parameter, particularly a running clearance and/or a state identification and/or at least one elasticity and/or at least one signal delay. By elasticity is meant herein an axial or rotational elasticity. The elasticity does not require a dedicated spring element, but rather can be implemented materially and/or geometrically in at least one of the gear unit elements or further actuation elements in the actuation path. Further, as has been described, running clearances can be taken into account, i.e., the distance that the gear unit elements have from one another in principle in the uncoupling position. The running clearances ultimately increase the path which must be traveled before the toothings can be brought into engagement with one another. Further, signal delays elapsing until a movement of the gear unit element is actually generated based on a control command for producing the coupling state may be taken into account. A further possibility consists in actively identifying a state of the coupling mechanism, for example, taking into account the position actually occupied by the gear unit element.

The determination of the speed can be defined additionally depending on a speed factor. The speed factor basically indicates the strategy for the actuation, i.e., particularly the speed or the speed range in which the actuation of the coupling mechanism is to be carried out. In this regard, the speed factor can predetermine various strategies, for example, to realize a comparatively slow but comfortable shifting such as is desirable, for example, in a comfort mode. If producing the coupling as quickly as possible takes priority over comfort requirements, this can also be taken into account by the speed factor. In principle, the speed factor can accordingly realize a differentiation between comfort and dynamics. For example, the speed factor can be externally commanded in that the user selects a corresponding mode. The speed factor can also be selected through a control device or drive manager, i.e., in a logic-based manner. The speed factor can also be triggered by the behavior of the driver, for example, through initiation of a kickdown or fully depressing the accelerator.

As has been described, the actuator generates the actuation movement which moves the gear unit element between the uncoupling position and the coupling position, particularly out of the uncoupling position into the coupling position. According to a configuration of the method, the speed can be implemented by a setting of the torque provided by the actuator and/or a current control and/or a rotational speed control. Therefore, depending on the actuation of the actuator, the maximum possible speed can be reduced such that the gear unit element is moved just fast enough that a tooth butting situation is reliably resolved before the toothings of the gear unit elements encounter one another or is resolved during the movement of the gear unit element, respectively, without having to stop the actuator. Further, this makes it possible to reduce the actuation speed, limit the current and, accordingly, reduce the torque acting on the actuator or the torque to be provided by the actuator. It is also possible to adjust the rotational speed of the actuator in order to obtain the desired actuation speed.

Aside from the method, one aspect of the invention is directed to a gear unit mechanism for a motor vehicle comprising a coupling mechanism with an actuation device which is configured to move a gear unit element of the coupling mechanism between a coupling position and an uncoupling position, the coupling mechanism being configured to adjust and/or change a speed at which the gear unit element is moved depending on a state parameter of the coupling mechanism. The gear unit mechanism is configured in particular to implement the above-described method. The invention is further directed to a motor vehicle comprising such a gear unit mechanism.

All of the advantages, details and features which have been described referring to the method are fully transferable to the gear unit mechanism and the motor vehicle.

BRIEF DESCRIPTION OF THE DRAWINGS

The invention will be described in the following based on an embodiment example referring to the drawings. The drawings are schematic and show.

DETAILED DESCRIPTION OF THE PRESENTLY PREFERRED EMBODIMENTS

Figure 2:
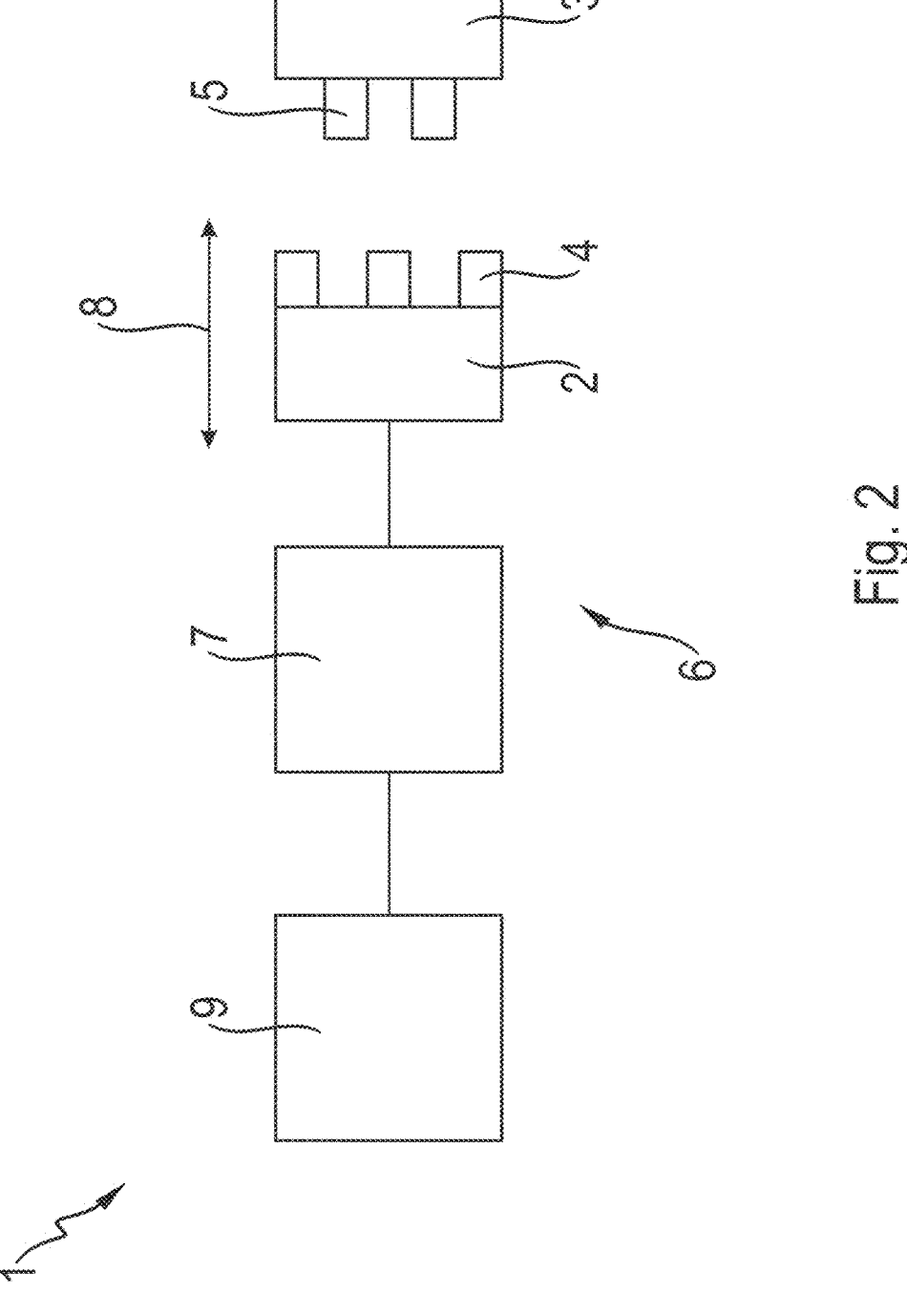
FIG. 2 is a schematic section of a gear unit mechanism with a coupling mechanism for a motor vehicle.

FIG. 2 shows a purely exemplary schematic flow of a coupling process of a coupling mechanism 1 of a motor vehicle, which coupling mechanism 1 is shown by way of example in FIG. 2. For coupling, for example, a first gear unit element 2, e.g., two dogs or a sliding sleeve, can be coupled with a second gear unit element 3, e.g., a clutch body. The first gear unit element 2 may also be referred to within the framework of the present application as a "coupling element". The gear unit elements 2, 3 have toothings 4, 5 which must be brought into engagement with one another to produce the coupling. Depending on the actual orientation of the toothings 4, 5 relative to one another, a meshing of the toothings is possible, or the teeth of the toothings 4, 5 abut one another in axial direction so that meshing is not possible. Such a state is also referred to as a tooth butting situation.

The coupling mechanism 1 has an actuation device 6 having an actuator 7 which is coupled, for example, with the first gear unit element 2 via a transmission, not shown in more detail, in order to move the gear unit element 2 between an uncoupling position and a coupling position. In the uncoupling position, gear unit element 2 is at a distance, particularly a running clearance, from gear unit element 3. In the coupling position, the toothings 4, 5 are engaged and the gear unit elements 2, 3 are accordingly coupled with one another. The movement (cf. arrow 8) generated by the actuator 7 can accordingly be used to move the gear unit element 2 in the form of an actuation movement in order to produce or cancel the coupling.

Further, the coupling mechanism 1 has a control device 9, or is connected to a control device 9, which can control the actuator 7. In this instance, it is possible, for example, to control how the actuator 7 is energized. Additionally or alternatively, the control device 9 can be configured to control the rotational speed of the actuator 7 and/or to control the torque of the actuator 7. In this way, it is possible to adjust the speed with which the gear unit element 2 is moved by corresponding control of the actuator 7.

In particular, the speed can be adjusted or changed based on a state parameter of the coupling mechanism 1. For example, instead of a maximum realizable speed, it is possible to adjust a speed which is reduced compared to the maximum speed. To this end, in particular, the resolution duration of an anticipated tooth butting situation can be included as state parameter. The resolution duration is based, for example, on constant parameters of the coupling mechanism 1, particularly the number of teeth of the gear unit elements 2, 3 and the resulting twist angle or tooth overlaps. Also, variables can be included, for example, the current rotational speed or difference in rotational speed of the gear unit elements 2, 3, the running clearance, a signal delay and elasticities in the actuation path, for example, of further gear unit elements or actuation elements, for example, a shifting fork, which move the gear unit element 2, or a transmission device which transmits the movement generated by the actuator 7 to the gear unit element 2.

Figure 1:
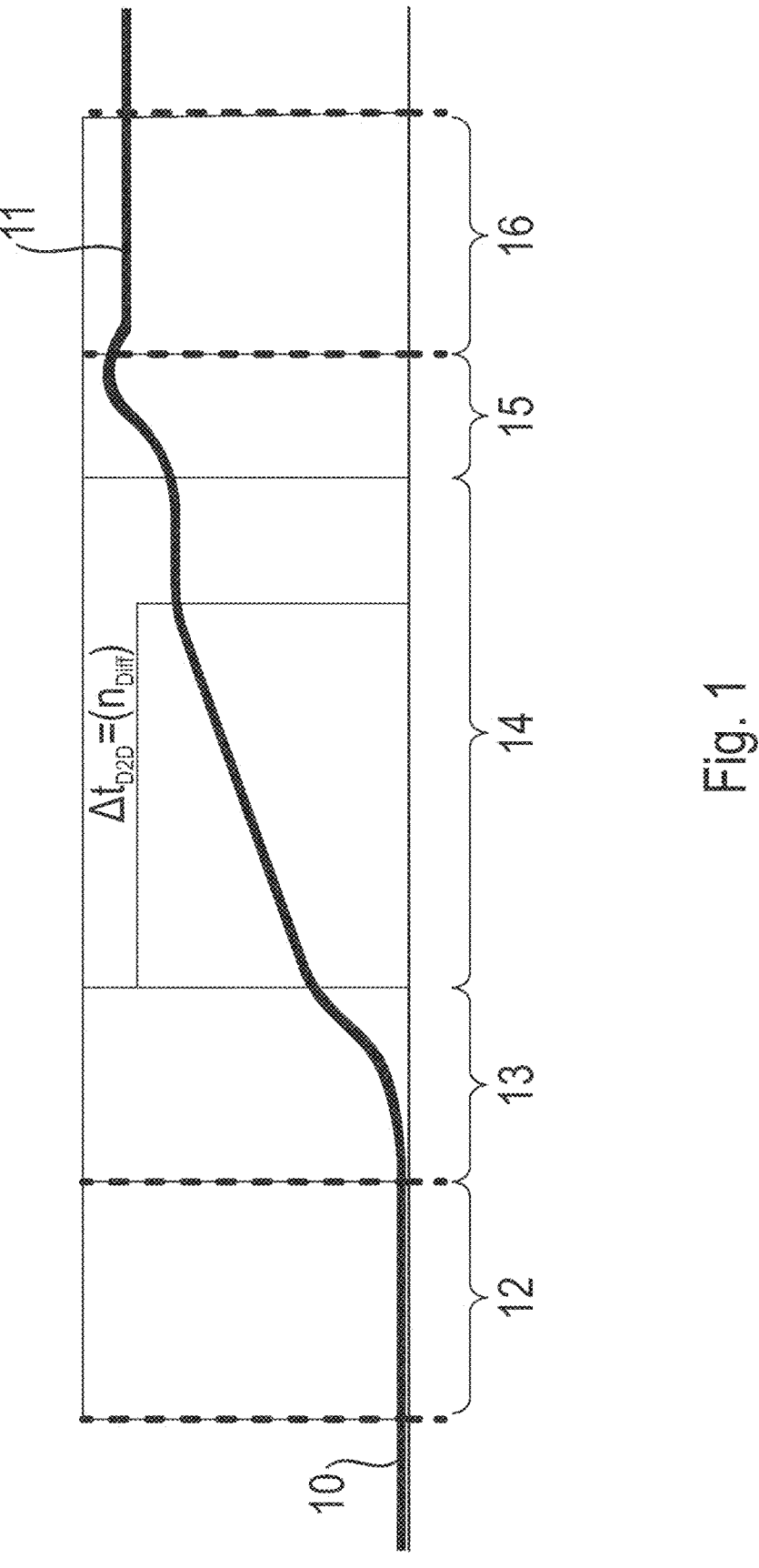
FIG. 1 is a diagram of a coupling process of a coupling mechanism for a motor vehicle.

FIG. 1 shows an exemplary flow of a coupling process in which the gear unit element 2 is to be moved, for example, between an uncoupling state 10 and a coupling state 11. Optionally, a signal delay is taken into account first in a time interval 12 and the overcoming of the running clearance is taken into account in a time interval 13. Further, the length of a resolution duration 14 for resolving an occurring tooth butting situation can be determined. This can be followed by an identification phase 15 in which the state of the coupling mechanism is identified or verified. It can in turn be taken into account that a signal delay follows in a time interval 16.

Accordingly, for producing the coupling, in particular, the resolution duration 14 which will take place for resolving the tooth butting situation when gear unit element 2 is brought toward gear unit element 3 can be taken into account. Based on the determined resolution duration 14, the control device 9 can control the actuator 7 in such a way that the gear unit element 2, i.e., the coupling element, is moved at a speed that is reduced from a maximum speed in order to produce the coupling.

In particular, this allows the actuator 7 to generate the movement in a continuous manner without needing to be stopped when a tooth butting situation occurs and started again subsequently after the resolution. Unnecessarily high actuation speeds which ultimately only result in the gear unit elements 2, 3 staying longer in the tooth butting situation can accordingly be prevented. Instead, the speed is adjusted such that, after the running clearance is overcome, the tooth butting situation is resolved in every case or is resolved during the actuation movement, for example, by taking into account a maximum time so that a continuous actuation movement can be carried out.

This further allows the actuation movement to be utilized also for detecting the state of the coupling mechanism 1 because, for example, the movement which is produced by the actuator 7 is also relevant for the position of the gear unit element 2.

The advantages, details and features described in relation to the method are completely transferrable to a gear unit mechanism with a coupling mechanism 1 and a motor vehicle having the coupling mechanism 1 and the gear unit device, respectively. The gear unit mechanism described herein with the coupling mechanism 1 is configured to implement the method described herein.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling a coupling process of a motor vehicle, wherein the motor vehicle has a coupling mechanism with an actuation device, the method comprising:

moving a gear unit element, configured as a coupling element of the coupling mechanism, between a coupling position and an uncoupling position by the actuation device; and setting and/or changing a speed at which the gear unit element is moved into the coupling position depending on a state parameter of the coupling mechanism, wherein the speed is set depending on a resolution duration.

2. The method according to claim 1, wherein the resolution duration is determined as a maximum time, after an expiration of which a tooth butting situation is resolved regardless of a current position of the gear unit element.

3. The method according to claim 1, wherein the resolution duration is determined based on at least one rotational speed of the gear unit element and/or a quantity of teeth of a toothing of the gear unit element, and/or on a maximum twist angle between two teeth and/or a maximum tooth overlap.

4. The method according to claim 1, wherein the resolution duration is an anticipated resolution duration, which defines a time span until a tooth butting situation is resolved.

5. The method according to claim 1, wherein the speed is set below a maximum possible speed or the maximum possible speed is reduced.

6. The method according to claim 1, wherein the speed is determined additionally depending on at least one of a running clearance and/or a state identification and/or at least one elasticity and/or at least one signal delay.

7. The method according to claim 1, wherein the speed is determined additionally depending on a speed factor.

8. The method according to claim 1, wherein the speed is implemented by a setting of a torque provided by an actuator and/or a current control and/or a rotational speed control.

9. A gear unit mechanism for a motor vehicle comprising:

a coupling mechanism with an actuation device configured to move a gear unit element configured as a coupling element of the coupling mechanism between a coupling position and an uncoupling position, wherein the coupling mechanism is configured to adjust and/or change a speed at which the gear unit element is moved depending on a state parameter of the coupling mechanism, wherein the speed is set depending on a resolution duration.

10. A motor vehicle comprising the gear unit mechanism according to claim 9.

\* \* \* \* \*